(No Model.)
F. C. DAMM.
TARGET TRAP.
No. 344,353. Patented June 29, 1886.
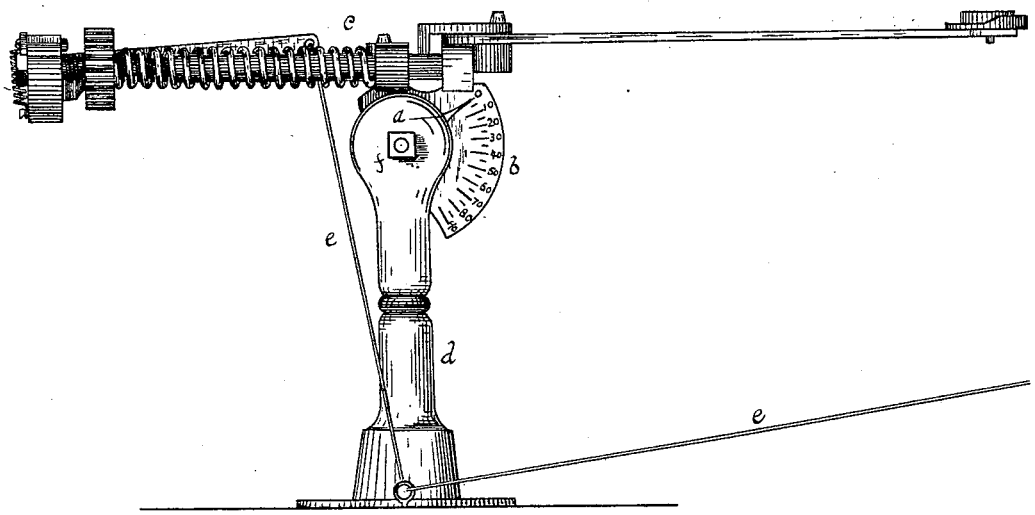
WITNESSES.
J. N. Bills
H. W. Waggoner
INVENTOR.
Fredrick C. Damm.
By L. P. Graham
Atty.

United States Patent Office.

FREDRICK C. DAMM, OF DECATUR, ILLINOIS.

TARGET-TRAP.

SPECIFICATION forming part of Letters Patent No. 344,353, dated June 29, 1886.

Application filed November 23, 1885. Serial No. 183,618. (No model.)

*To all whom it may concern:*

Be it known that I, FREDRICK C. DAMM, of the city of Decatur, county of Macon, and State of Illinois, have invented certain new and useful Improvements in Target-Traps, of which the following is a specification.

My invention relates to target-traps that are radially adjustable in a vertical plane, and is intended to provide means whereby the angle of adjustment in such traps may be definitely determined.

The target in common use is of an approximate disk formation, and the surface presented to the marksman varies with the angle at which the target is projected, becoming larger as the direction of projection approaches the vertical and smaller as it more nearly assumes a horizontal line. In view of this fact it is obvious that any record of a score would fail to give an accurate account of the skill of the marksman unless the angle at which the targets were projected formed a part of said record.

As previously constructed, target-traps have been wanting in a device to indicate the angle at which the targets were projected, and in consequence thereof it has been possible for a marksman to throw his targets nearly perpendicular and get the credit of a better score than his superior in skill who set his trap at a lower angle.

My invention consists in a target-trap capable of radial adjustment in a vertical plane, and an angle-indicator connected with said trap in such a manner that the degree at which its targets are projected may be accurately determined.

In the drawing accompanying and forming a part of this specification the principle of my invention is illustrated.

$a$ is an indicating-pointer attached to standard $d$.

$b$ is a plate connected with the pivoting-trap $c$, and graded to correctly indicate geometrical degrees.

$e$ is the cord by which the trap is thrown.

$f$ is an adjusting-bolt in standard $d$, on which the trap $c$ pivots, and by means of which the said trap is secured in its various positions.

In the drawing the trap is shown as adjusted to project a target in a horizontal line, and the pointer $a$ is at zero on plate $b$. By means of the nut and bolt $f$ the trap may be adjusted and held at various angles with the horizontal, and the number of degrees will always be correctly announced by the indicator.

As shown and described, the pointer is rigid with the standard, and the indicating-plate partakes of the motion of the trap; but this arrangement may be reversed without affecting the principle of my invention.

The form and arrangement of the trap as shown forms no part of my present invention, and any trap having radial adjustment in a vertical plane will readily co-operate with my indicating device.

Having thus described my invention, I claim as new and desire to secure by Letters Patent—

1. The combination of a target-trap pivoted in a standard in a manner permitting radial adjustment vertically, a pointer on the standard, and a degree-indicator on the trap in proximity to the pointer, as set forth.

2. A standard, a trap pivoted vertically in the standard, a degree-indicating plate concentric with the pivot of the trap, and a pointer radial with said pivot, as set forth.

In testimony whereof I sign my name in the presence of two subscribing witnesses.

FREDRICK C. DAMM.

Attest:
 GEO. Z. SCOTT,
 L. P. GRAHAM.